(12) United States Patent
Wittebrood et al.

(10) Patent No.: US 6,605,370 B2
(45) Date of Patent: Aug. 12, 2003

(54) METHOD OF MANUFACTURING AN ALUMINIUM JOINED PRODUCT

(75) Inventors: Adrianus Jacobus Wittebrood, Velserbroek (NL); Jacobus Van Rijkom, Santpoort-Noord (NL); Axel Smeyers, Heist Op Den Berg (BE)

(73) Assignee: Corus Aluminum Walzprodukte GmbH, Koblenz (DE)

( * ) Notice: Subject to any disclaimer, the term of this patent is extended or adjusted under 35 U.S.C. 154(b) by 0 days.

(21) Appl. No.: 10/230,429

(22) Filed: Aug. 29, 2002

(65) Prior Publication Data
US 2003/0064242 A1 Apr. 3, 2003

Related U.S. Application Data

(63) Continuation-in-part of application No. 09/984,968, filed on Oct. 31, 2001.
(60) Provisional application No. 60/304,447, filed on Jul. 12, 2001.

(30) Foreign Application Priority Data

Sep. 5, 2001 (EP) ............................................. 01203339

(51) Int. Cl.$^7$ ............................. B32B 15/20; B23K 1/00
(52) U.S. Cl. ....................... 428/652; 148/518; 148/528; 148/535; 228/101; 228/214; 228/262.5; 228/262.51; 428/648; 428/654; 428/658; 428/668; 428/674; 428/675; 428/680; 428/935; 428/936
(58) Field of Search ................................ 428/652, 648, 428/654, 658, 668, 674, 675, 680, 935, 936; 148/518, 528, 535; 228/101, 214, 262.5, 262.51

(56) References Cited

U.S. PATENT DOCUMENTS 2,821,014 A 1/1958 Miller (List continued on next page.)

FOREIGN PATENT DOCUMENTS

DE 3821073 1/1989

(List continued on next page.)

OTHER PUBLICATIONS

Wernick and Pinner, "The Surface Treatment and Finishing of Aluminium and its Alloys", 5$^{th}$ Edition, vol. 1, pp. 181–182 and pp. 191–203 (1988) (no month given).

(List continued on next page.)

*Primary Examiner*—Robert R. Koehler
(74) *Attorney, Agent, or Firm*—Stevens, Davis, Miller & Mosher, LLP

(57) ABSTRACT

Disclosed is a method of manufacturing an aluminium or aluminium alloy joined product, such as a shaped and hollow member, comprising the sequential steps of: (a) providing two parts made of aluminium or aluminium alloy, each part having a peripheral flange; (b) positioning the two parts such that the peripheral flange of one part faces the peripheral flange of the other part to form an assembly, and joining the facing flanges of the two parts by heating. During step (b) the faces of the peripheral flanges of the two parts are coupled to each other via a separate aluminium joining product having a base substrate of an aluminium alloy comprising silicon in an amount in the range of 2 to 18% by weight, and on the outer surface of the base a deposited layer comprising nickel and a further separately deposited layer on one side of the layer comprising nickel, and the separately deposited layer comprising a metal such that taken together the aluminium base substrate and all layers exterior thereto form a metal filler having a liquidus temperature in the range of 400 to 570° C.

14 Claims, 3 Drawing Sheets

U.S. PATENT DOCUMENTS

| | | | |
|---|---|---|---|
| 3,482,305 A | 12/1969 | Dockus et al. |
| 3,597,658 A | 8/1971 | Rivera |
| 3,963,454 A | 6/1976 | Singleton, Jr. |
| 3,970,237 A | 7/1976 | Dockus |
| 4,028,200 A | 6/1977 | Dockus |
| 4,157,154 A | 6/1979 | Scott et al. |
| 4,164,454 A | 8/1979 | Schober |
| 4,388,159 A | 6/1983 | Dockus et al. |
| 4,602,731 A | 7/1986 | Dockus |
| 4,721,653 A | 1/1988 | Oda et al. |
| 5,069,980 A | 12/1991 | Namba et al. |
| 5,422,191 A | 6/1995 | Childree |
| 5,466,360 A | 11/1995 | Ehrsam et al. |
| 5,601,695 A | 2/1997 | Muranushi |
| 6,129,262 A | 10/2000 | Cooper et al. |
| 6,379,818 B1 | 4/2002 | Mooij et al. |
| 2002/0086179 A1 | 7/2002 | Wittebrood et al. |
| 2002/0102431 A1 | 8/2002 | Wittebrood et al. |

FOREIGN PATENT DOCUMENTS

| | | |
|---|---|---|
| DE | 19531035 A1 | 2/1997 |
| DE | 19531035 C2 | 2/1997 |
| DE | 19938847 | 3/2001 |
| EP | 0227261 | 7/1987 |
| EP | 0587307 | 3/1994 |
| FR | 2354171 | 1/1978 |
| FR | 2617868 | 1/1989 |
| GB | 1176688 | 1/1970 |
| WO | 0071784 | 11/2000 |

OTHER PUBLICATIONS

Wernick and Pinner, "The Surface Treatment and Finishing of Aluminium and its Alloys", $5^{th}$ Edition, vol. 2, pp. 1006–1022 and pp. 1023–1071 (Ch. 14–15)(1988) (no month given).

SAE Paper No. 880446 by B.E. Cheadle and K.F. Dockus, "Inert Atmosphere Fluxless Brazing of Aluminium Heat Exchangers" ICE, Detroit, Michigan, Feb. 29–Mar. 4, 1988, pp. 1–11.

Bureau of Mines Technology, "Aluminium Soft–Soldering", 2301 N.T.I.S. Tech Notes (manufacturing), XP–002119816, 1985, Jan. No. 1G, Springfield, VA pp. 12–13.

Adrianus Jacobus Wittebrood, Jacques Hubert Olga Joseph Wijenberg, Joop Nicolaas Mooij, "Nickel–plated Aluminium Brazing Sheet", Research Disclosure, No. 439, pp. 1946–1947 (Nov. 2000).

Jacobson, D.M. et al., "A New Low–Melting–Point Aluminum Braze", Welding Journal, American Welding Society, vol. 75, No. 8, pp. 243–250 (Aug. 1996).

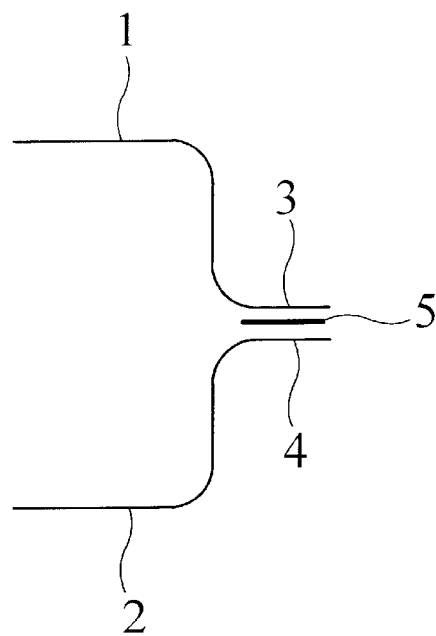
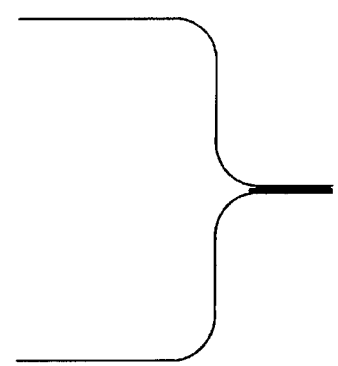
Fig. 2A  Fig. 2B
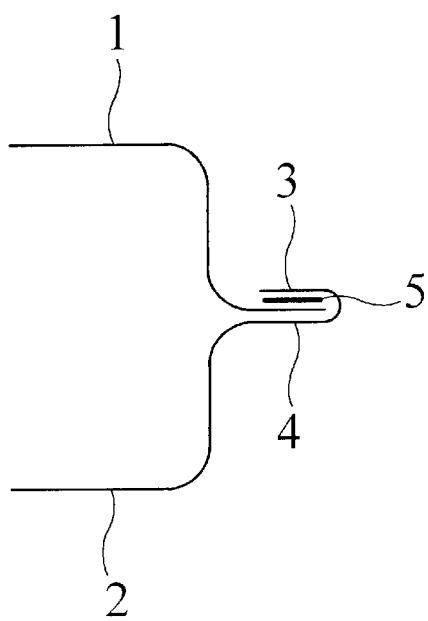
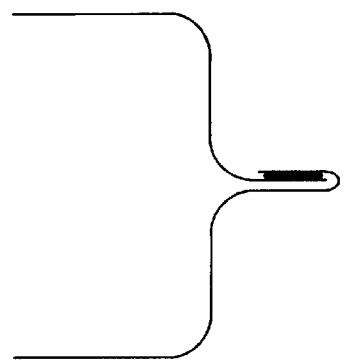
Fig. 2C  Fig. 2D

METHOD OF MANUFACTURING AN ALUMINIUM JOINED PRODUCT

CROSS-REFERENCE TO RELATED APPLICATIONS

This is a continuation-in-part of U.S. patent application Ser. No. 09/984,968, filed Oct. 31, 2001 (pending) which claims priority under 35 U.S.C. 119(e) from U.S. provisional patent application serial No. 60/304,447, filed Jul. 12, 2001 (abandoned), both of which are incorporated herein by reference in their entirety.

FIELD OF THE INVENTION

The invention relates to a method of manufacturing an aluminium or aluminium alloy joined product, such as a shaped and hollow member, comprising the sequential steps of: (a) providing two parts made of aluminium or aluminium alloy, each part having a peripheral flange, (b) positioning the two parts such that the peripheral flange of one part faces the peripheral flange of the other part, and joining the facing flanges of the two parts by heating. The invention further relates to a fluid or gas container manufactured by this method.

BACKGROUND OF THE INVENTION

The positioning of a fuel tank in a car has restrictions and requirements leading to a very complex shape which creates several difficulties in forming and manufacturing of such a fuel tank. Traditionally a major market share of such fuel tanks have been made from a high-density poly-ethylene polymer. However, due to changing legislative regulations, it appears questionable whether polymer-based fuel tanks can be used in cars in the future at reasonable costs. A potential change appears to be the use of steel or aluminium for such fuel tanks and for other complex shaped parts alike. However, steel and especially aluminium alloys have many restrictions on their formability and much of the research efforts are dedicated to improve the formability characteristics of these metals and to the methods of forming complex shaped parts thereof, for example by means of blow forming and hydroforming using a warm pressure medium. After forming complex shaped parts, the shaped parts are joined together to form a hollow member.

Such a method as set out in the preamble is known from German patent no. DE-195 31 035 C2. According to this known method at least parts of the edges or the flanges of aluminium or flat aluminium alloy sheets are placed on top of each other forming an assembly. The overlapping edges or flanges facing each other are joined together by means of a brazing operation. Multiple assemblies may be stacked together in one brazing furnace. Following the brazing operation the joined assembly is placed in a closable mould or die, after which the assembly is being expanded in a hydroforming process by means of the introduction of a heated oil having a temperature of more than 150° C. to form a shaped and hollow member or product, such as a fuel tank.

A disadvantage of the known method is that the flat aluminium alloy sheets in whole prior to hydroforming are being subjected to a brazing operation under a controlled atmosphere and using a NOCOLOK (trade name) brazing flux material. The brazing operation has the effect of a heat treatment, typically for several minutes at a temperature of about 590° C., on the aluminium alloy sheets and adversely affecting its formability characteristics for the subsequent hydroforming operation, and thereby restricting the choice for the aluminium alloy. Also, the temperature used for the brazing operation restricts the choice for the aluminium alloys to those aluminium alloys having no low melting phases of below 610° C. Furthermore, the use of a brazing flux material restricts the choice for the aluminium alloys further to those alloys having a very low Mg-content, and thereby excludes the use of AA5000-series aluminium alloys and most of the AA6000-series aluminium alloys. In addition, since a brazing flux material is used all the disadvantages of applying such a brazing flux material during assembling and the residual removal thereof after brazing are inherent to the brazing process used. And in addition, the assembling of inner parts like for example baffles in the hollow member is restricted.

SUMMARY OF THE INVENTION

It is an object of the present invention to provide a method of manufacturing an aluminium or aluminium alloy joined product, such as a shaped and hollow member, which method can be applied for a wide range of aluminium alloy parts.

It is another object of the invention to provide a method of manufacturing an aluminium or aluminium alloy joined product, such as a shaped and hollow member, which method can be applied under normal atmospheric conditions and on an industrial scale.

According to the invention there is provided a method of manufacturing an aluminium or aluminium alloy joined product, such as a shaped and hollow member, comprising the sequential steps of: (a) providing two parts made of aluminium or aluminium alloy, each part having a peripherical flange, (b) positioning the two parts such that the peripherical flange of one part faces the peripherical flange of the other part to form an assembly, and then joining the facing flanges of the two parts by heating. The method is characterised in that during step (b) the faces of the peripherical flanges of the two parts are coupled to each other via a separate aluminium joining product having a base substrate of an aluminium alloy comprising silicon in an amount in the range of 2 to 18% by weight, preferably 7 to 11%, and on the outer surface of the base a deposited layer comprising nickel and a further separately deposited layer on one side of the layer comprising nickel, and the separately deposited layer comprising a metal such that taken together the aluminium base substrate and all layers exterior thereto form a metal filler having a liquidus temperature in the range of 400 to 570° C., and preferably in the range of 500 to 540° C.

When using the separate aluminium joining product in the method according to the invention it has been found that a strong and reliable joint or bond between the two parts is obtained under normal atmospheric joining conditions, thus without the need for a vacuum atmosphere or the need for a protective gas atmosphere such as nitrogen or argon, or without the use of a brazing flux material such as mixtures of alkali and alkaline earth chlorides and fluorides commonly used in conventional brazing operations. The joint obtained is gas leak-tight, and the width of the joint can be arranged in dependence of the content of the final shaped and hollow member, e.g. certain fluids might require a longer diffusion barrier in order to meet legislative requirements on environment, safety or health. Since this method does not require special precautions with respect to the joining environment the method can be applied readily on an industrial scale.

Furthermore, in accordance with the invention it has been found that due to the use of the separate aluminium joining product and the possibility of local heating a wide variety of aluminium alloy parts can be joined to each other. It has been found that the manufacturing method can tolerate magnesium levels up to about 6% by weight in the aluminium alloy parts to be joined, while still resulting in a good bonding between the aluminium alloy parts. Also the aluminium base substrate of the separate aluminium joining product to be used in the method may tolerate high levels of magnesium. Aluminium alloy parts having a chemical composition within the Aluminium Association ("AA")5000 series aluminium alloys and having Mg in a range of up to 6% by weight as one of the important alloying elements can be used, such as, but not limited thereto, AA5052, AA5754, AA5083, AA5383, AA5086, AA5182 and AA5059, and modifications thereof. Apart from the traditional AA3000-series aluminium alloys, also those aluminium alloys within the range of AA2000, AA6000 and AA7000 series aluminium alloys can be used now, enabling for the design of shaped and hollow members having a high strength. Although several of these high strength alloys may have relatively low melting eutectic phases or the like, due to the obtainable low melting point of the aluminium joining product, melting or partial melting of such phases does not occur during the formation of the joint in the method of this invention.

Preferably the aluminium alloy parts are made of sheet material, and can be in the form of a flat blank or in a pre-formed and shaped form, for example complex shapes formed by means of deep-drawing, blow forming or hydroforming.

Joining of the facing flanges of the two parts during step (b) can be done by placing the whole assembly in a furnace having an elevated temperature and holding the assembly at this elevated temperature for a period long enough for melting and spreading of only the molten filler to form a joint between the facing or overlapping flanges. It has been found that when using the separate aluminium joining product the assembly can be heated and brazed at lower temperatures under controlled atmosphere conditions ("CAB"), preferably in fluxless CAB. After joining by means of brazing, the assembly may be shaped, formed or calibrated into a hollow member for example by means of hydroforming as known in the art.

In a preferred embodiment of the method according to the invention during step (b) the heating is applied locally to the area of the overlapping or facing flanges by heating at elevated temperature for a period long enough for melting and spreading of only the molten filler to form a joint between the facing or overlapping flanges of the two facing parts.

In an embodiment during step (b) the local heating of the aluminium joining product is achieved by means of a welding operation. In particular a seam welding operation may be applied, such as a laser-welding and a resistance roller seam welding. These types of welding techniques are accepted welding techniques, and which allow for application and use on an industrial scale. Due to the low melting point of the aluminium joining product the roller seam welding technique may be applied without the risk of melting or partial melting of the aluminium alloys used for the parts of the shaped and hollow member. It should be emphasized here that in the invention welding techniques by using known welding hardware are applied without melting of the aluminium parts to be joined, whereas in the conventional definition of welding substantial amount of the base, in the present case the aluminium parts, is melted during welding. In the method according to the invention there might be a minor chance that some local melting of an aluminium part occurs, but this local melting of such an aluminium part is to be understood as unintentionally and not deliberately aimed at, and is to be avoided. In addition due to the local heating at the assembly, only the region of the flanges are subjected very locally to a heat-input, thereby avoiding any adverse effect of heating on the remaining of the aluminium parts, and allowing a much wider selection of aluminium alloys for the aluminium parts to be joined. In this embodiment for example different aluminium alloys, such as inner- and outer-parts of a car, can be joined to each other on a reliable and industrial scale.

In an embodiment during step (b) the local heating of the aluminium joining product is achieved by means of brazing, and preferably by means of torch brazing, such as automatic torch brazing or mechanised flame brazing. Any number of torches may be used in any number of positions and arrangements. Flames may surround the assembly, and successive flames may be applied to thicker parts to bring them up to temperature.

In an embodiment of the aluminium joining product the aluminium base substrate is an aluminium alloy sheet or aluminium alloy wire or rod. The aluminium base substrate is preferably made of an AA4000-series aluminium alloy, such as AA4004, AA4045, AA4046 and AA4047, or modifications thereof. Such an AA4000-series aluminium alloy sheet or strip, typically having a gauge in the range of up to 3 mm, and preferably in the range of 0.04 to 2 mm, may be employed. The sheet or strip is plated on both sides with the layer comprising nickel and the further metal layer in accordance with the invention, and whereby during a heating operation the aluminium joining product as a whole melts to form the required metal filler for obtaining the joint. A similar approach can be used for applying multiple metal layers on AA4000-series aluminium alloy wires or thin rods having a diameter of up to 3 mm.

In another embodiment the aluminium joining product is formed by an aluminium brazing sheet product having an aluminium alloy core sheet, and which core sheet during the heating operation of step (b) does not melt and does not form part of the filler metal, the core sheet has on both outer surfaces coupled, for example by means of cladding, the aluminium base substrate set out above and which can in the case of brazing sheet product also be referred to as an aluminium clad layer, the aluminium clad layer being made of an aluminium alloy comprising silicon in an amount in the range of 2 to 18% by weight, preferably 7 to 11%, and is typically an AA4000-series alloy, and further a layer comprising nickel, preferably applied by means of plating, on the outer surface of the aluminium clad layer, and whereby there is a further separately deposited layer, preferably applied by means of plating, on one side of the layer comprising nickel and the further separately deposited layer comprising a metal such that taken together the aluminium clad layer and all layers exterior thereto form a metal filler having a liquidus temperature or melting temperature in the range of 400 to 570° C., and preferably in the range of 500 to 540° C.

With the method according to the invention there is provided a brazing sheet product which may be employed to join the two aluminium parts at significantly lower temperatures as compared to traditional brazing or welding temperatures, and achieving a very strong bonding.

For the brazing sheet product the aluminium clad layers are usually thinner than the aluminium core sheet, each aluminium clad layer constituting 5 to 25% of the total composite thickness. An aluminium clad layer more typically constitutes around 5 to 15% of the total composite thickness.

In an embodiment of the method according to the invention in the aluminium joining product the further layer comprising a metal such that taken together the aluminium base substrate, or alternatively the aluminium clad layer in case of a brazing sheet product, and all layers exterior thereto form a metal filler having a liquidus temperature in the range of 400 to 570° C., and preferably in the range of 500 to 550° C., and most preferably in the range 500 to 540° C., comprises copper or copper-based alloy, and preferably the further layer comprises at least 60% by weight copper, and more preferably at least 80%. Suitable copper-based alloys may be brass or bronze.

Preferably the further deposited layer comprising copper or copper-based alloy has a thickness up to 10 micron, more preferably up to 6 micron, and have been applied by electroplating. In the best results a thickness of about 4 micron has been used. The thickness of the respective layers are adjusted to the desired composition of the filler metal.

In particular copper has been found to significantly reduce the liquidus temperature of the metal filler. However, further metal layers of for example zinc or tin may be applied in addition thereto, for example as a bonding layer having a thickness of not more than 1 micron, and preferably of not more than 0.3 micron, between the outer surface of the aluminium base substrate and the layer comprising nickel.

In an embodiment of the aluminium joining product according to the invention the deposited layer comprising nickel further comprises bismuth as alloying element in a range up to 5% by weight. In accordance with the invention it has been found surprisingly that the nickel layer does not need to comprise any lead as a mandatory alloying addition in order to achieve good joining. It has been found that equal or even better results can be obtained if bismuth is added to the nickel layer, such that the nickel layer can be kept lead-free and simultaneously also in the plating bath preferably used for the electrodeposition of such a Ni—Bi alloy layer.

In the joining product the layer comprising nickel, and optionally bismuth also, has a thickness up to 2 μm, preferably up to 1.0 μm, and more preferably up to 0.5 μm. A coating thickness of greater than 2 μm may result in wrinkling of the molten filler material during subsequent joining. A preferred minimum thickness for this metal layer is about 0.5 μm.

An embodiment of the aluminium joining product used in the method according to this invention is characterised in that taken together the aluminium base substrate, or alternatively the aluminium clad layer in the case of a brazing sheet product, and all layers exterior thereto, have a composition comprising at least, by weight percent:

Si in a range of 2 to 18%, preferably 7 to 11%,
Cu in a range of 12 to 25%, preferably 12 to 18%,
Bi in a range up to 0.25%, preferably 0.01 to 0.25%,
Ni in a range of 0.5 to 4%, preferably 0.5 to 3%,
Sn in a range of up to 8%, preferably up to 5%,
Mg in a range of up to 4%, preferably up to 2%,
Zn in a range up to 20%, preferably up to 5%, more preferably up to 2%,
Fe in a range of up to 0.8%,
impurities each<0.05%, total<0.25%,
balance aluminium.

In this embodiment a metal filler is obtained which has a liquidus temperature in the range of 500 to 540° C., and allows for the manufacturing of joined products, such as shaped and hollow members or outer- and inner-parts of different aluminium alloys of a car at significant lower temperatures compared to traditional industrial scale joining techniques without the risk of melting or partly melting of the aluminium alloys used for the aluminium parts, such as blanks formed into half-scale parts. The magnesium present in the filler metal originates preferably from the aluminium base substrate or the aluminium clad layer in the case of a brazing sheet product. The composition of the filler metal, and thereby the liquidus temperature, may be selected dependent on the choice of the aluminium alloy parts composition.

In a further aspect of the invention there is provided a joined aluminium alloy product manufactured from the method in accordance with the invention.

In a further aspect of the invention there is provided a fluid or gas container manufactured from the method in accordance with the invention.

In yet a further aspect of the invention there is provided a fuel tank, in particular for automotive application, manufactured from the method in accordance with the invention.

BRIEF DESCRIPTION OF THE DRAWINGS

The invention will now be illustrated with reference to the drawings, wherein:

FIGS. 2A to 2D are schematic sections showing parts of a shaped and hollow member joined by the method in accordance with the invention, and are taken from the area marked "A" in FIG. 1;

DETAILED DESCRIPTION OF THE PREFERRED EMBODIMENTS

Figure 1:
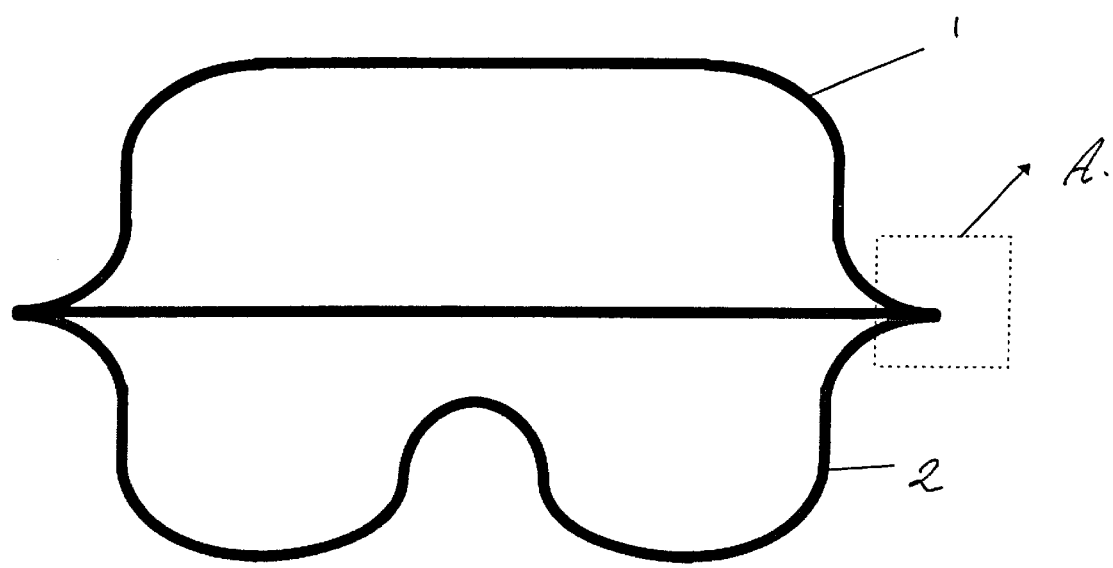
FIG. 1 is a schematic cross-sectional view of a shaped and hollow member manufactured by the method in accordance with the invention.

FIG. 1 shows schematically the cross-sectional view of a shaped and hollow member, such as a fluid container, in which there are at least two aluminium alloy parts 1,2 formed by two half-scales which have been joined together at their respective peripheral flanges. The area marked "A" is shown in more detail in FIGS. 2A to 2D.

FIG. 2A shows schematically two shaped bare aluminium alloy parts 1,2, each part having edges or peripheral flanges 3,4, the flanges are being positioned such that the flange 3 of one part 1 faces the flange 4 of the other part 2. The two facing flanges are devoid of any metallic layer thereon. Prior to the heating operation there is interposed between the two facing flanges the aluminium joined product 5 in accordance with the invention. During subsequent heating of at least the region of the facing flanges with the interposed separate aluminium joining product, during which heating only melting of the metal filler occurs, a strong bond is obtained as schematically shown in FIG. 2B.

FIG. 2C shows schematically the arrangement in which one flange 4 overlaps the other flange 3 such that a lock seam is obtained. Following the heating operation a strong bond is obtained as schematically shown in FIG. 2D. It will be immediately apparent to the skilled person that the there are various joint designs possible without departing from the scope of the invention, such as, but not limited thereto, lap joints, hemmed joints, single strap butt joints, flush lap joints, all in which the aluminium joining product is interposed between the flanges or overlapping edges of the aluminium alloy parts prior to heating to above the melting temperature of the metal filler.

Figure 3A:
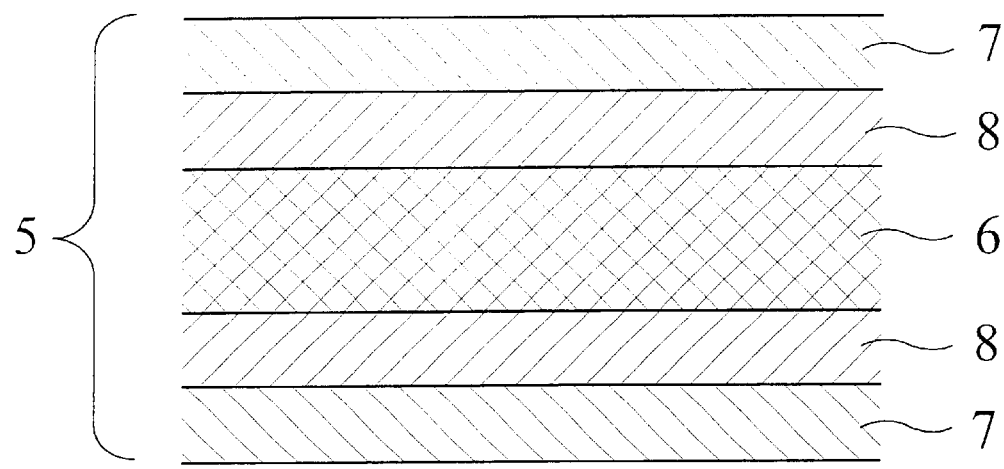
FIGS. 3A and 3B are a schematic longitudinal section showing the structure of the separate aluminium joining product used in the method according to the invention.

FIG. 3A shows schematically an aluminium joining product used in the method according to the invention, and having in the embodiment shown a substrate 6 in the form of a strip of an aluminium alloy comprising silicon as the main alloying element in a range of 2 to 18% by weight, and preferably 7 to 11%, and further on both sides of the outer surface of the strip an applied metal layer 8 comprising nickel, and on the outer surface of the layer 8 comprising nickel there is a further layer 7 comprising a metal, preferably a copper based metal, such that taken together the substrate 6 and all layers exterior thereto 7,8 form a metal filler. In this embodiment the aluminium joining product as a whole forms the filler metal. It will be immediately apparent for the skilled person that the further metal layer 7 can also be applied on the substrate layer 6, and whereby the nickel comprising layer 8 is applied on the outer surface of the layer 7. The composition of the various layers and their advantages have been set out above.

Figure 3B:
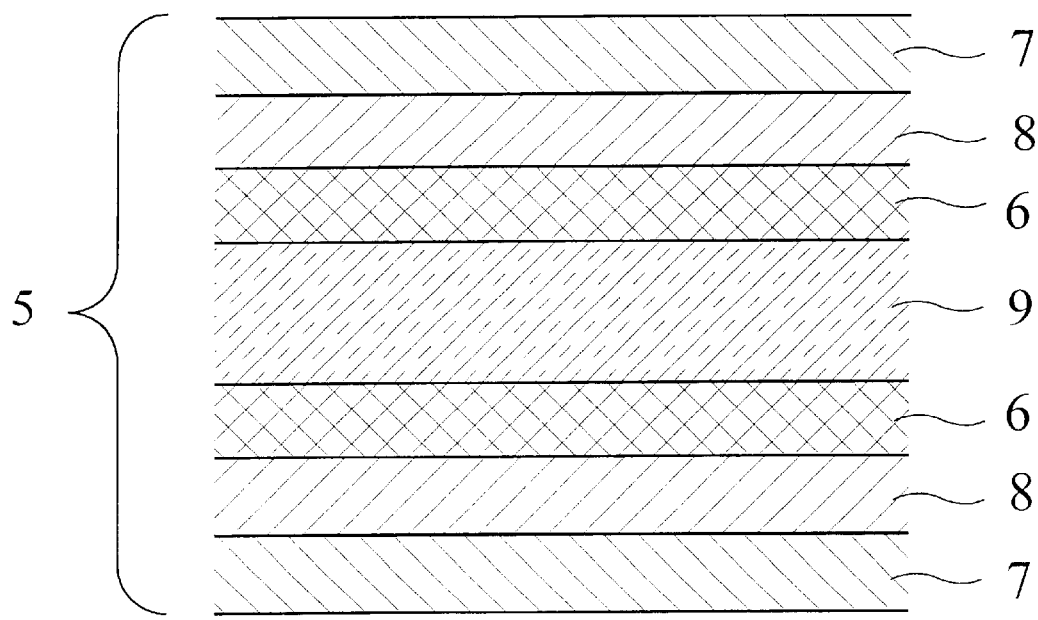

FIG. 3B shows schematically a further aluminium joining product for use in the method according to the invention, and whereby in this embodiment the aluminium brazing product is formed by an aluminium brazing sheet product having an aluminium core sheet 9, which aluminium core sheet does not melt during a heating operation, and on the outer surface of the core sheet on both sides there is provided an aluminium clad layer of an aluminium alloy comprising silicon as the main alloying element in a range of 2 to 18% by weight, and preferably 7 to 11%, and further on the outer surface of the aluminium clad layer a metal layer 8 comprising nickel, and on the layer 8 comprising nickel there is a further layer 7 comprising a metal such that taken together the aluminium clad layer 6 and all layers exterior thereto 7,8 form a metal filler. Analogous to the embodiment shown in FIG. 3A, in this embodiment shown in FIG. 3B the sequence of the layers 7 and 8 may be changed. The composition of the various layers and their advantages have been set out above.

Having now fully described the invention, it will be apparent to one of ordinary skill in the art that many changes and modifications can be made without departing from the spirit or scope of the invention as herein described.

What is claimed is:

1. Method of manufacturing an aluminium or aluminium alloy joined product, comprising the sequential steps of:
    (a) providing two parts made of aluminium or aluminium alloy, each part having a peripheral flange;
    (b) positioning the two parts such that the peripheral flange of one part faces the peripheral flange of the other part to form an assembly, and then joining the facing flanges of the two parts by heating,
    wherein, during step (b) the faces of the peripheral flanges of the two parts are coupled to each other via a separate aluminium joining product having a base substrate of an aluminium alloy comprising silicon in an amount in the range of 2 to 18% by weight, and on the outer surface of said base a deposited layer comprising nickel and a further separately deposited layer on one side of the layer comprising nickel, and the separately deposited layer comprising a metal such that taken together the aluminium base substrate and all layers exterior thereto form a metal filler having a liquidus temperature in the range of 400 to 570° C.

2. Method according to claim 1, wherein during step (b) the heating is applied locally by heating at elevated temperature for a period long enough for melting and spreading of the molten filler to form a joint between the facing flanges of the two facing parts.

3. Method according to claim 2, wherein during step (b) the local heating is applied by means of a welding operation.

4. Method according to claim 3, wherein during step (b) the local heating is applied by means of a seam welding operation.

5. Method according to claim 2, wherein during step (b) the local heating is applied by means of a brazing operation.

6. Method according to claim 5, wherein during step (b) the local heating is applied by means of a fluxless CAB brazing operation.

7. Method according to claim 1, wherein said further deposited metal layer comprises at least 60% by weight copper.

8. Method according to claim 1, wherein taken together said aluminium base substrate and all layers exterior thereto, have a composition comprising, in weight percent:
    Si in a range of 7 to 11%,
    Cu in a range of 12 to 25%,
    Bi in a range up to 0.25%,
    Ni in a range of 0.5 to 4%,
    Mg in a range up to 4%,
    Sn in a range up to 8%,
    Zn in a range up to 20%,
    Fe in a range up to 0.8%,
    impurities each<0.05%, total<0.25%,
    balance aluminium.

9. Method according to claim 1, wherein taken together said aluminium base substrate and all layers exterior thereto, have a composition comprising, in weight percent:
    Si in a range of 7 to 11%,
    Cu in a range of 12 to 18%,
    Bi in a range up to 0.25%,
    Ni in a range of 0.5 to 4%,
    Mg in a range up to 4%,
    Sn in a range up to 8%,
    Zn in a range up to 20%,
    Fe in a range up to 0.8%,
    impurities each<0.05%, total<0.25%,
    balance aluminium.

10. Method according to claim 1, wherein the aluminium alloy joined product is a shaped and hollow member.

11. A joined aluminium product manufactured from a method according to claim 1, wherein the aluminium alloy is selected from the group consisting of AA2000, AA3000, AA5000, AA6000, and AA7000-series aluminium alloys.

12. Product according to claim 11, wherein the aluminium alloy joined product is a shaped and hollow member.

13. A fluid or gas container manufactured from a method according to claim 1.

14. A fuel tank manufactured from a method according to claim 1.

* * * * *

UNITED STATES PATENT AND TRADEMARK OFFICE
CERTIFICATE OF CORRECTION

PATENT NO. : 6,605,370 B2
DATED : August 12, 2003
INVENTOR(S) : Adrianus Jacobus Wittebrood et al.

It is certified that error appears in the above-identified patent and that said Letters Patent is hereby corrected as shown below:

<u>Title page,</u>
Item [73], the Assignee's name is spelled -- Corus Aluminium Walzprodukte Gmbh --.

Signed and Sealed this

Second Day of December, 2003

JAMES E. ROGAN
*Director of the United States Patent and Trademark Office*